US012295284B2

(12) United States Patent
Tavares

(10) Patent No.: US 12,295,284 B2
(45) Date of Patent: May 13, 2025

(54) ADJUSTABLE GRASS TRIMMER ATTACHMENT

(71) Applicant: Antonio Tavares, Haverhill, MA (US)

(72) Inventor: Antonio Tavares, Haverhill, MA (US)

( * ) Notice: Subject to any disclaimer, the term of this patent is extended or adjusted under 35 U.S.C. 154(b) by 0 days.

(21) Appl. No.: 17/402,393

(22) Filed: Aug. 13, 2021

(65) Prior Publication Data

US 2025/0031610 A1   Jan. 30, 2025

(51) Int. Cl.
*A01D 34/416* (2006.01)
*A01D 34/67* (2006.01)
*A01D 34/74* (2006.01)

(52) U.S. Cl.
CPC ......... *A01D 34/4167* (2013.01); *A01D 34/67* (2013.01); *A01D 34/74* (2013.01)

(58) Field of Classification Search
CPC ..... A01D 34/4167; A01D 34/67; A01D 34/74
USPC ........................................................ 30/272.1
See application file for complete search history.

(56) References Cited

U.S. PATENT DOCUMENTS

| | | | | |
|---|---|---|---|---|
| 1,523,729 A * | 1/1925 | Snyder | ..................... | A01G 3/06 172/16 |
| 2,721,433 A * | 10/1955 | Berdan | .................. | A01G 3/062 280/43 |
| 4,043,101 A * | 8/1977 | Lahr | ....................... | A01G 3/062 56/17.1 |
| 4,182,100 A * | 1/1980 | Letter | ................... | A01D 34/416 56/16.9 |
| 4,224,784 A * | 9/1980 | Hansen | ................... | A01G 3/062 56/16.9 |
| 4,442,659 A * | 4/1984 | Enbusk | ................ | A01D 34/001 280/47.24 |
| 4,531,350 A * | 7/1985 | Huthmacher | .......... | A01D 34/90 280/47.2 |
| 4,688,376 A * | 8/1987 | Wolfe, Sr. | ............ | A01D 34/001 56/16.7 |
| 4,704,849 A * | 11/1987 | Gilbert | ................... | A01D 34/84 56/16.7 |
| 4,756,148 A * | 7/1988 | Gander | .................. | A01D 34/84 172/17 |
| 4,829,755 A * | 5/1989 | Nance | .................. | A01D 34/001 56/400.14 |
| 4,914,899 A * | 4/1990 | Carmine | ................ | A01G 3/062 56/16.9 |
| 4,922,694 A * | 5/1990 | Emoto | .................. | A01D 34/001 56/16.7 |
| 5,092,112 A * | 3/1992 | Buckendorf, Jr. | .......................... | A01D 34/4167 D8/7 |
| 5,095,687 A * | 3/1992 | Andrew | ............... | A01D 34/416 30/296.1 |
| 5,107,665 A * | 4/1992 | Wright | .................... | A01G 3/062 30/276 |
| 5,279,102 A * | 1/1994 | Foster | .................... | A01D 34/63 56/DIG. 18 |

(Continued)

*Primary Examiner* — Sean M Michalski

(57) ABSTRACT

An apparatus for an adjustable grass trimmer, is disclosed. The apparatus includes an elongated shaft comprising a first end and a second end. The apparatus includes a supporting device configured to support a trimmer, wherein the supporting device comprises of a set of three support members. The apparatus includes a plurality of wheels configured to be mounted on the supporting. The apparatus includes a one or more guard wheel stops affixed to each of the plurality of wheels.

8 Claims, 5 Drawing Sheets

(56) References Cited

U.S. PATENT DOCUMENTS

| | | | | |
|---|---|---|---|---|
| 5,287,683 | A | * | 2/1994 | Smith ............... A01D 34/416 56/16.7 |
| 5,351,762 | A | * | 10/1994 | Bean ................ A01D 34/90 56/16.7 |
| 5,408,816 | A | * | 4/1995 | Cartier ............. A01D 34/001 56/DIG. 18 |
| 5,423,126 | A | * | 6/1995 | Byrne ............... A01D 34/84 30/286 |
| 5,450,715 | A | * | 9/1995 | Murray .............. A01D 34/001 56/16.9 |
| 5,459,985 | A | * | 10/1995 | Gedert .............. A01D 34/416 30/296.1 |
| 5,467,584 | A | * | 11/1995 | Boyles .............. A01D 34/001 56/16.7 |
| 5,477,665 | A | * | 12/1995 | Stout ............... A01D 34/416 56/16.7 |
| 5,626,006 | A | * | 5/1997 | Fricke, Sr. ......... A01D 34/001 30/276 |
| 5,836,142 | A | * | 11/1998 | Maxwell ............. A01D 34/001 56/16.7 |
| 2003/0177646 | A1 | * | 9/2003 | Watanabe ............ A01G 3/08 30/277.4 |
| 2014/0283388 | A1 | * | 9/2014 | Dedmon .............. A01D 34/4166 30/122 |
| 2014/0325852 | A1 | * | 11/2014 | Walmsley ............ A01D 34/902 30/276 |
| 2023/0144921 | A1 | * | 5/2023 | Hoffmann ............ A01D 34/416 30/276 |

* cited by examiner

ADJUSTABLE GRASS TRIMMER ATTACHMENT

FIELD OF THE INVENTION

The present disclosure relates to a grass trimmer apparatus. Specifically, the present disclosure relates to an adjustable grass trimmer attachment, for trimming in tight spaces.

BACKGROUND

Powered, handheld implements such as weed trimmers, lawn edger's, brush cutters, etc., are examples of tools normally held by both hands during use. These implements and others like them generally include a longitudinal shaft with a motor or other power source mounted on the rear portion of the shaft and a cutting head or other energetic device, driven or energized by the power source, mounted on the front portion of the shaft. Lawn mowers, and grass trimmers are often used to cut grass or weeds in wide open areas, where there is lots of land, and areas to maneuver. A conventional trimmer comprises of a motorized mobile device with at least two wheels, with elongated handles extending upward for the user to push and pull the trimmer along grassy open areas. Accordingly, during operation the trimmer is housed under the mobile device. The trimmer comprises of a head that rotates and the trimmer line cuts weeds, grass and other vegetation. The operator of the weed trimmer typically grips the handles provided on a shaft to hold the trimmer head over the weeds, grass or other vegetation being cut. This, however, can result in fatigue to the operator, particularly during prolonged periods of operating the weed trimmer. Additionally, the large size of the conventional trimmer makes it difficult for a user to cut a straight line alone a fixed structure, along tight quarters, or in otherwise tight spaces. Furthermore, obtaining small, accurate movements of the mobile device in these tight spaces or when using the trimmer for tilted cutting on uneven or sloped terrain can be prohibitively difficult using a conventional trimmer. Accordingly, improvements to the trimmer stability, and handle, along with configurations of these and other implements held in a similar manner are desirable.

Embodiments of the invention, on the other hand, provide significant advantages while overcoming the above-described and other disadvantages, as will now be described.

SUMMARY

Several embodiments of an adjust grass trimmer attachment for a power implement are shown and described herein. In one representative embodiment, an apparatus for an adjustable grass trimmer, is disclosed. The apparatus includes an elongated shaft comprising a first end and a second end. The apparatus includes a supporting device configured to support a trimmer, wherein the supporting device comprises of a set of three support members. The apparatus includes a plurality of wheels configured to be mounted on the supporting. The apparatus includes a one or more guard wheel stops affixed to each of the plurality of wheels.

In one embodiment, the first end comprises of a handle configured to be held by an operator.

In one embodiment, the first end comprises of a support end configured to be attachable to the supporting device.

In one embodiment, the one or more guard wheel stops are configured to swivel 360 degrees.

In one embodiment, the adjustable grass trimmer comprises of a shaft selected from the range of ⅞ inch to 1 inch.

In one embodiment, the supporting device comprises of: at least three pieces of metal, a swivel, one or more straight wheels, one or more brackets, a set of coupling screws, and a set of screw knobs configured to adjust the height of the adjustable grass trimmer.

In one embodiment, the one or more guard wheel stops are configured to contact a fixed surface, and maintain a straight line.

In one embodiment, the adjustable grass trimmer is configured with a curved or straight trimmer.

In one embodiment, the adjustable grass trimmer is configured with a gas or electric trimmer.

In one embodiment, at least two of the set of three support members are configured to be adjust able on an axis point to adjust one or more of the height, angle, or depth of the adjustable grass trimmer.

This summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Disclosed herein are embodiments of an interchangeable double-sided attachment for an article. This description includes drawings, wherein.

Figure 1:
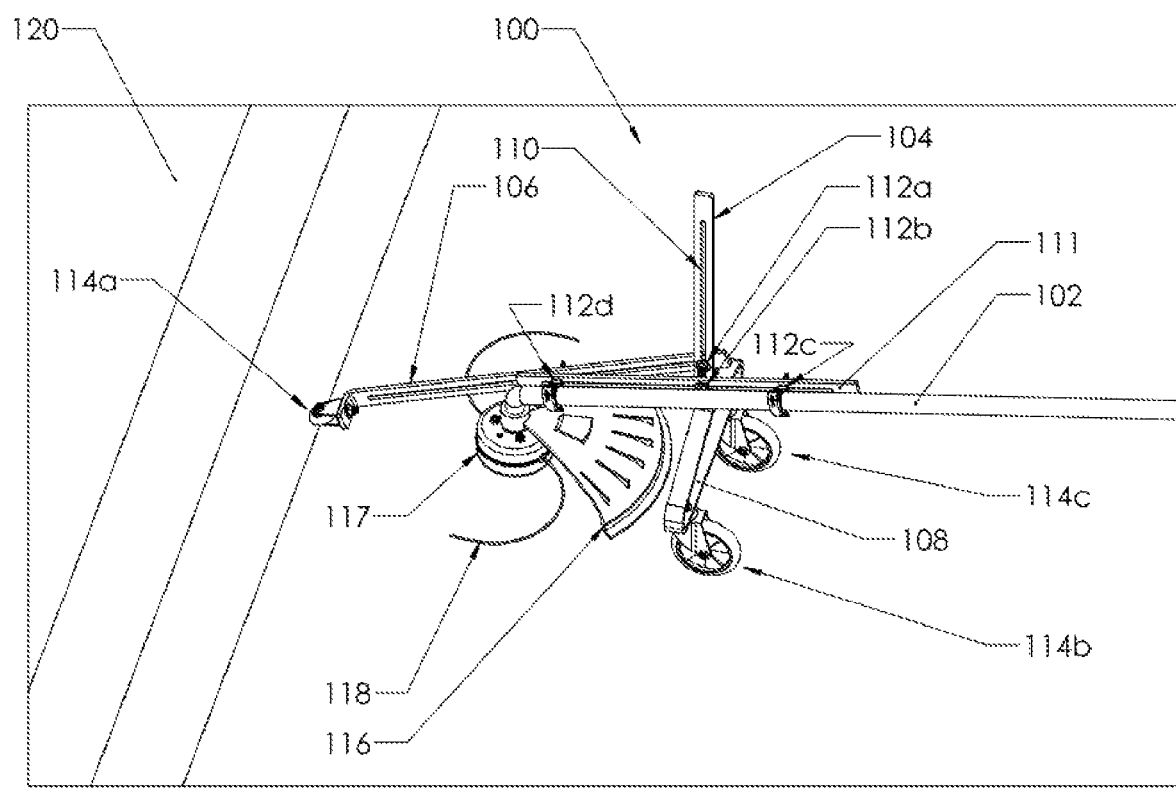
FIG. 1 depicts an exemplary embodiment of an adjustable grass trimmer attachment, in accordance with an example.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

The invention may be embodied in other specific forms without departing from the spirit of essential characteristics thereof. The present embodiments therefore to be considered in all respects as illustrative and not restrictive, the scope of the invention being indicated by the appended claims rather than by the foregoing description, and all changes which come within the meaning and range of equivalency of the claims are therefore intended to be embraced therein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 3:
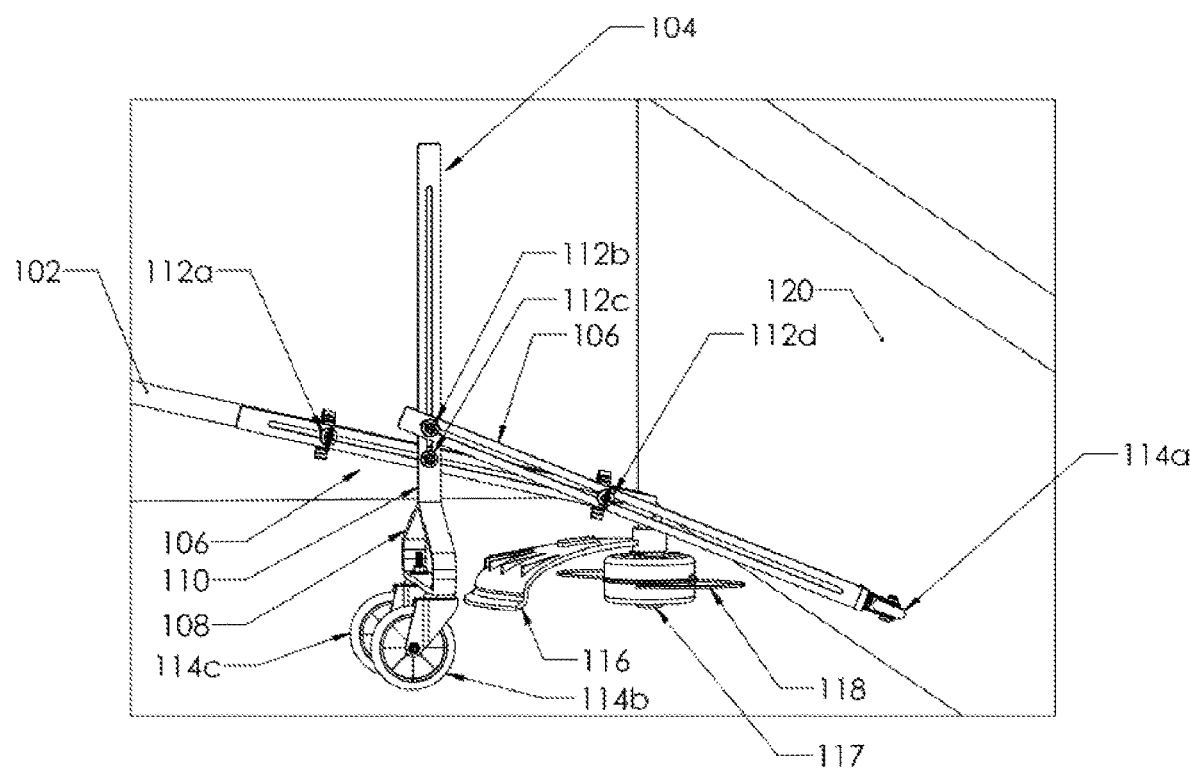
FIG. 3 depicts a set of adjustable arms of the adjustable grass trimmer attachment in accordance with an example.

FIG. 1 depicts an apparatus for an adjustable grass trimmer 100. The apparatus includes an elongated shaft 102 comprising a first end and a second end. The first end comprises of a handle for an operator to maneuver the device, and control the direction of the trimmer 100. The second end is utilized as the supporting end, that is configured to support the supporting device. The supporting device is configured to support and stabilize the trimmer 100 that is extended from the elongated portion. The supporting device is configured to maintain the trimmer at a predetermined height, depth, or length respective to the ground or vegetation below it. The supporting device is configured with three support members that are positioned to form a triangular shape, as shown in FIG. 3. Each of the support members 104, 106, 108, 110, 111 are secured at each of their proximal and distal ends to each of the other support members, in order to form the three corners of the triangular shape. At each of the corners, there are securing devices 112a-c selected from one or more of nuts, bolts, washers, or screws, in order to secure each of the support members to the other support members.

Figure 2:
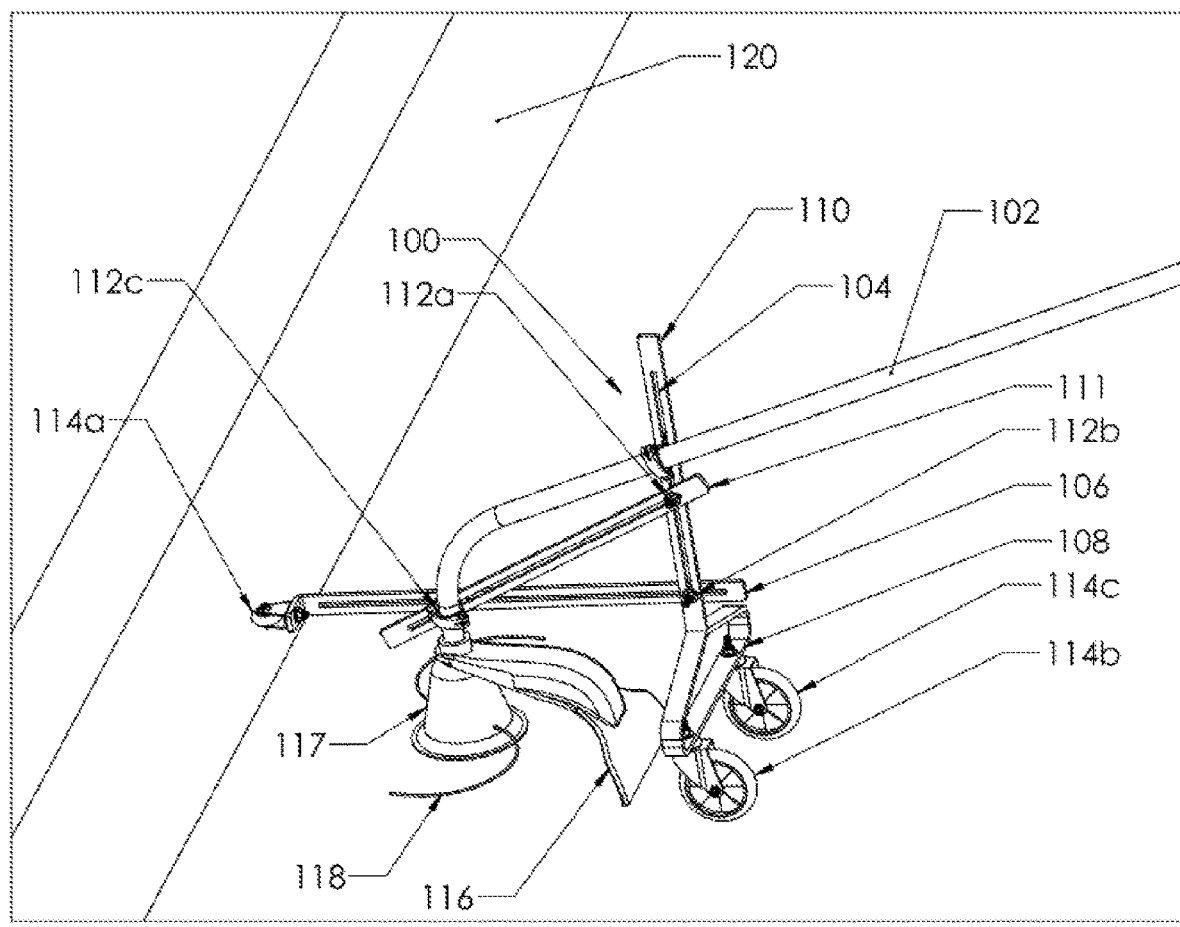
FIG. 2 depicts an adjustable grass trimmer attachment extended for operation, in accordance with an example.

The supporting device further comprise of a plurality of wheels 114a-c that are configured to allows the adjustable grass trimmer to be mobile in one or more of a forward direction, a backward direction, or a horizontal direction, as shown in FIG. 2. Each of the plurality of wheels 114a-c can be permanently affixed or removably attached to the supporting device. As the trimmer is operated by an operator, the operator can adjust to or more of the securing devices 112a-c in order to preset a height of the trimmer 118 to ensure the vegetation or grass is cut at a certain level. In addition, the apparatus includes a guard wheel stop affixed to an end of a horizontally extending support member. The horizontally extending support member 106 is configured to secure the plurality of wheels 114a-c on a first end, and secure the guard wheel stop on a second end. The guard wheel stop is configured to contact a fixed structure 120 in order to establish a cutting distance between the trimmer and the fixed structure. Accordingly, this ensures that the trimmer 118 is able to cut a straight line cut at a consistent depth in relation to the fixed structure 120. In addition. A securing member 112 is configured to adjust the depth at a predetermined distance by the operator prior or during operation.

Figure 4:
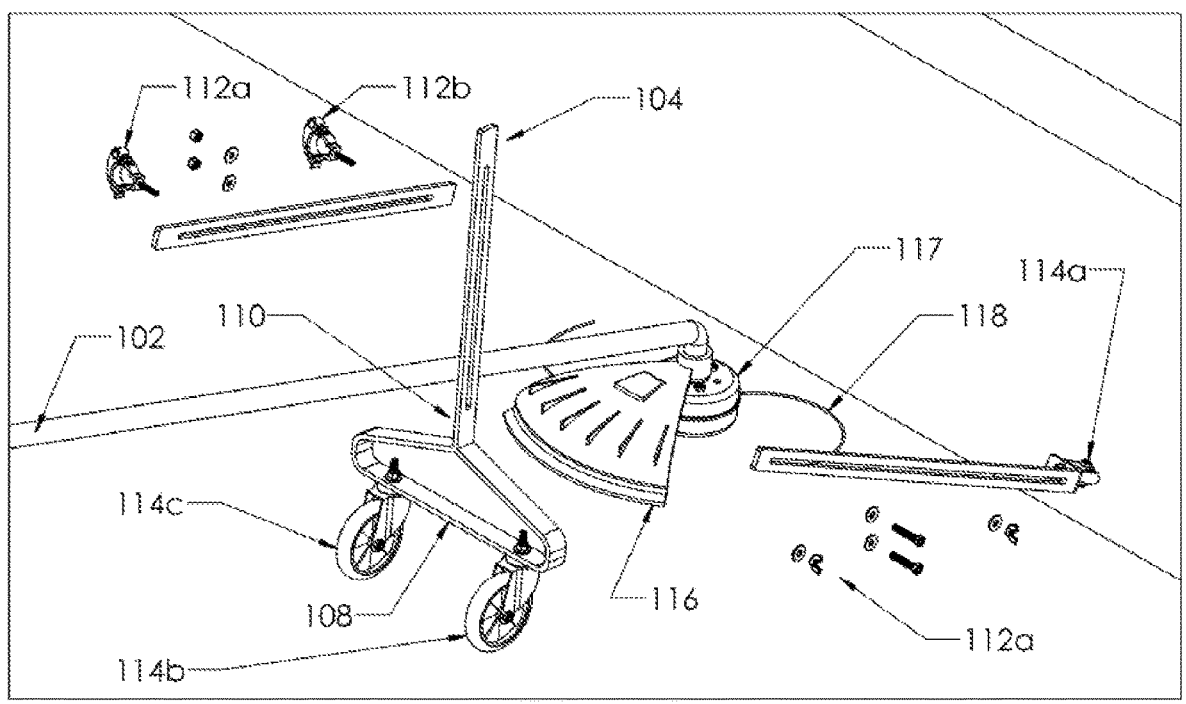
FIG. 4 depicts an additional embodiment of an adjustable grass trimmer attachment, in accordance with an example.

As shown in FIG. 4, in some embodiments, the horizontally extending support member 106 can also secure the trimmer and a debris stopper 116 connected to the trimmer 118. The trimmer 118 can further be electric or gas operated. In some embodiments, the trimmer can be interchangeable and thus be removed from the supporting device in favor of a different trimmer device.

Figure 5:
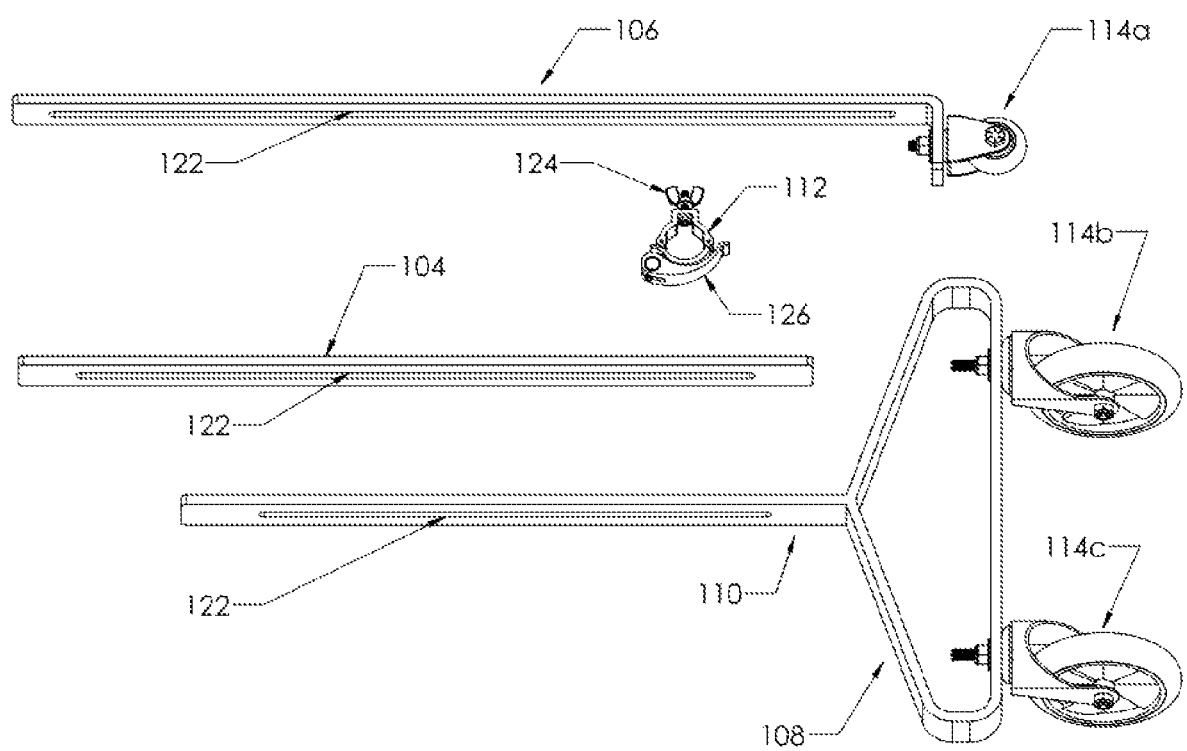
FIG. 5 is an exploded via of the support members, in accordance with an example.

FIG. 5 is an exploded via of the support members. The support members are each configured to form a triangular shape in order to provide support, angle, horizontal extension, and vertical height adjustment to facilitate a trimmer 117 adjustment. The cross bracket 104 is configured to be positioned in parallel and adjacent to the vertical support member 110 in order to allow for the vertical adjustment.

The vertical support member 110 is attached to a base structure 108 that is configured to provide support to the other supporting members 104, and 106 when attached to each other at one or more attachment points. The base structure 108 is further configured to receive two wheels 114b-c that are secured via a securing means such as a screw and bolt mechanism or other securing mechanism. The wheels are positioned to be able to rotate in a 360-degree circumference in order to allow the trimmer to be rotated in one direction or another or at various angles. The base can be a triangular structure, a pentagon structure or another polygon that allows for sufficient support and stability.

There is an additional wheel on the horizontal support member 106, configured to contact a fixed structure. The wheel 114a is configured to roll along the fixed structure, at a horizontal position, maintaining the operator's desired distance from the fixed structure, while also allowing for fluid movement. Each of the supporting members 104, 110, and 106 are configured to be removably attached to each other to form various triangular structures such as an equilateral triangle, an isosceles triangle, or an obtuse triangle relative to the distance from a fixed structure, the height of the vegetation that is being cut by the trimmer, or the angle of the cut needed of the vegetation. The supporting members 104, 106, 110 are attached to each other via a securing bracket that includes a hinge lock 126 mechanism as well as a bolt and screw securing mechanism 124. The bolt and screw mechanism allows for the securing device to be attached to within the pass-through grooves 122 of each of the supporting members 104, 106, 110. The bolt portion passes through the grooves 122 and is securing in the grooves 122 with a bolt that is configured to rotate around the threads of the bolt and be tightened. The hinge lock 126 allows for each of the grooves to be attached to the support shaft as shown in FIG. 1 to FIG. 3. The extending portion of the hinge lock 126 extends out to be loosened from the shaft and closed inward in order to secure lightly around the shaft.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

Although the present invention has been described in terms of various embodiments, it is not intended that the invention be limited to these embodiments. Modification within the spirit of the invention will be apparent to those skilled in the art.

It is additionally noted and anticipated that although the device is shown in its most simple form, various components and aspects of the device may be differently shaped or modified when forming the invention herein. As such those skilled in the art will appreciate the descriptions and depictions set forth in this disclosure or merely meant to portray examples of preferred modes within the overall scope and intent of the invention and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the scope of the invention.

What is claimed is:

1. An apparatus for an adjustable grass trimmer and capable of being interconnected to trimmers of different configurations, the trimmers having an elongated shaft comprising a first end including a handle configured to be held by an operator and a second end including a portion configured to be attachable to a supporting device; the apparatus comprising:

a supporting device configured to support a trimmer, wherein the supporting device comprises of a set of exactly three support members, each member being an elongated, flat, rectangular piece including a straight linear slot along its length;

a first support member from the set of support members terminates in a loop with two wheels each mounted on the loop, wherein the wheels are mounted to permit rotating about their respective axes of rotation, and additionally to each swivel about an axis perpendicular to their respective rotational axes, so that the wheels may swivel and rotate relative to the loop; and a second support member from the set of support members terminates in a flange at an angle to the elongated portion of the second support member, and has only a single guard wheel stop affixed to the flange and configured to swivel, so that the guard wheel stop can rotate about its central axis, and swivel about an axis perpendicular to the guard wheel central axis; wherein, two or more clamp members are provided to provide a releasable coupling between a third support member from the set of support members and a trimmer elongated shaft; and wherein the set of three support members are configured to be adjustable relative to each other, by adjusting a point of connection between any two or more support members so that their adjusted relative position adjusts one or more of a height, angle, or depth of the adjustable grass trimmer to one or more guidance positions of the wheels and/or the guard wheel stop.

2. The apparatus of claim 1, wherein the one or more guard wheel stops are configured to swivel 360 degrees.

3. The apparatus of claim 1, wherein the adjustable grass trimmer comprises of a shaft selected from a range of ⅞ inch to 1 inch.

4. The apparatus of claim 1, wherein the supporting device comprises of: metal; and further includes a set of coupling screws for coupling the support members to each other; and a set of screw knobs configured to compress or release the coupling screws to permit a relative movement of the support members to each other and the trimmer so as to adjust the height of the adjustable grass trimmer.

5. The apparatus of claim 1, wherein the one or more guard wheel stops are configured to contact a fixed surface, and maintain a straight line.

6. The apparatus of claim 1, wherein the adjustable grass trimmer is configured with a curved or straight trimmer.

7. The apparatus of claim 1, wherein the adjustable grass trimmer is configured with a gas or electric trimmer.

8. The apparatus of claim 1, wherein the set of three support members are configured to form a triangle.

* * * * *